United States Patent Office 2,968,528
Patented Jan. 17, 1961

2,968,528
PROCESS FOR PRODUCING CLARIFIED PHOSPHORIC ACID

Raymond E. Tuttle, William W. Harwood, and Donald J. Smalter, Lakeland, Fla., assignors to International Minerals & Chemical Corporation, a corporation of New York No Drawing. Filed July 1, 1957, Ser. No. 668,862

5 Claims. (Cl. 23—165)

This invention relates to improvements in the process for the preparation of purified acidic phosphorus-bearing solutions. More particularly, the invention relates to purification of "wet process" phosphoric acid. Still more particularly, it relates to the clarification of concentrated "wet process" phosphoric acid.

Acidic phosphorus-bearing solutions, i.e., "wet process" phosphoric acid or monocalcium phosphate solutions predominated by phosphoric acid and usually having a $CaO/P_2O_5$ mole ratio of 0.6:1 or less, are prepared by reaction of phosphate rock with sulfuric acid. This process presents many difficult purification problems to produce products of commercial value. The crude phosphoric acid, or water solution obtained by leaching superphosphates, is separated from insoluble residues and precipitates, principally silica and calcium sulfate.

With separation of insolubles, the crude solutions still contain in solution iron, aluminum, fluorine, and calcium compounds together with minor amounts of manganese, magnesium, etc. In addition, the crude solutions contain varying amounts of organic matter. These various impurities must be removed in order to have a phosphoric acid saleable in competition with "furnace acid" for the manufacture of fertilizer and/or animal feed grade products. Removal of color is necessary to improve the saleability of the acid regardless of the intended use.

Fluorine, iron and aluminum content of the acid may be reduced to desired levels by precipitation methods. Filtering operations remove some solids and color from dilute acid solutions. However, upon cooling of solids-free hot concentrated phosphoric acid, additional solids form in solution over an extended period of time, i.e., about 14 days, and upon concentration of a, for example, 46% $P_2O_5$ content acid to between 52% and 56% $P_2O_5$ content, a light colored acid develops a black, opaque appearance.

It is a primary object of this invention to overcome the shortcomings of processes heretofore in use.

It is another object of this invention to provide a method of eliminating the black color of concentrated acid.

It is another object of this invention to provide a method of accelerated solids settling so that substantially complete solids removal can take place within a relatively short period of time.

These and other objects of the invention will be apparent to those skilled in the art from the following description.

Now it has been discovered that whereas concentrated phosphoric acid solutions require at least a week or more for appreciable settling of solids and clarification of the acid when treated with either oxidizing agents alone or flocculating agents alone, the acid, if held at an elevated temperature and successively treated first with the oxidizing agent and then with the flocculating agent, is clarified and the solids can be accumulated in a matter of hours in a minor fraction of the acid permitting recovery of between about 65% and 75% of the acid volume as a greenish colored clarified acid.

More in detail, "wet process" phosphoric acid, generally obtained as a dilute solution of 20% to 35% $P_2O_5$, is concentrated in any one of a number of different type evaporators to a $P_2O_5$ concentration in excess of about 50% $P_2O_5$.

This concentrated acid is sometimes defluorinated by boiling at a temperature of about 295° F. and passage of steam therethrough. Defluorination is not essential to the invention and the process is equally effective in the treatment of undefluorinated acid.

Into concentrated acid, while at a temperature of at least 160° F. and below the deactivating temperature of the flocculating agent, and preferably at a temperature in the range between about 180° F. and 220° F., is mixed oxidizing agent such as nitric acid, potassium permanganate, potassium dichromate, hypochlorous acid solutions, and the like, or combinations thereof in amounts up to about 2% by weight and preferably in the range between about 0.5% and about 1.0% by weight of the acid. Addition of nitric acid results in the most violent reaction and the formation of large volumes of foam, i.e., 40 to 50% volume increase in the mixed acid volume. With strong agitation, the foams can be broken down in about 1 to 10 minutes. This mixing operation may be carried out batchwise or on a continuous basis. The oxidizing agent may be added to concentrated phosphoric acid in a holding tank provided with good agitating means or the oxidizing agent may be introduced into a flowing stream of phosphoric acid being delivered to a holding tank or solids settling and separation equipment.

To the reacted mixture of phosphoric acid and oxidizing agent is added a flocculating agent stable in strong acid solution. Useful flocculating agents are, for example, water soluble high molecular weight synthetic polymers such as the polyacrylamide resin sold under the trade name "Separan" or the hydrolyzed polyacrylonitrile resin or the salts thereof such as the sodium and potassium salts.

Flocculating agents are generally added in amounts between 0.08 pound and about 0.3 pound of agent per ton of acid and preferably between about 0.1 pound and 0.15 pound of agent per ton of acid. After addition of these flocculating agents, the mixtures are subjected to mild agitation, such as obtained by flowing the mixture through a baffled trough or launder.

Upon holding the treated acid for 4 hours at a temperature of at least 160° F. and preferably between 170° F. and 220° F. in a settling zone equipped for separate withdrawal of an upper layer and a lower layer, a solids-free layer can be observed to form and upon holding a definite settling rate of about 4 to 5 inches per day, is obtained until a major portion of the acid volume is clear and accumulation of concentrated solids in the minor portion gives rise to establishment of a slower rate due to hindered settling effect.

Settling rates are determined in accordance with the standard settling test shown in Taggart, "Handbook of Mineral Dressing" section entitled, "Design of Settling Tanks," Coe and Clevenger method, section 15, page 21.

The invention will be further understood from the following example which is given by way of illustration and without any intention that the invention be limited thereto.

*Example*

Phosphoric acid produced by the reaction of Florida phosphate ore and sulfuric acid was obtained as a crude 26% $P_2O_5$ solution. This acid was concentrated to about 52.8% $P_2O_5$ concentration by submerged combustion evaporation. This product was a black acid containing 25% by volume of suspended solids.

To 200 parts by weight of black concentrated acid, at a temperature of about 200° F., was added one part by weight of equivalent 100% HNO$_3$, added as 67% HNO$_3$. After stirring for 5 minutes to disperse HNO$_3$, to give it reaction time and to break down the foam, there was added .01 part of water soluble polyacrylamide resin in the form of 0.1% solution.

This treated acid was not allowed to cool below 180° F. In a matter of 4 hours, a clear liquor was observable and upon holding a settling rate of 4 to 4½ inches per day was accomplished.

Having thus described this invention, what is desired to be secured by Letters Patent is:

1. The method of clarifying concentrated acidic phosphorus-bearing solution selected from the group consisting of wet process phosphoric acid and solutions of mixtures of monocalcium phosphate and wet process phosphoric acid predominated by phosphoric acid which comprises mixing into said acidic solution successively with agitation, from about 0.5% to about 2.0% by weight of an oxidizing agent selected from the group consisting of nitric acid, potassium permanganate, potassium dichromate, hypochlorous acid, and mixtures thereof, agitating the mixture for a period of from about 3 minutes to about 10 minutes, subsequently adding from about 0.08 pound to about 0.3 pound per ton of said acidic solution of a flocculating agent stable in strong acid solution selected from the group consisting of water-soluble high molecular weight synthetic polyacrylamide resin, water-soluble high molecular weight hydrolyzed synthetic polyacrylonitrile resin, and the potassium and sodium salts thereof, and mixtures thereof, holding the mixture at a temperature of between about 180° F. and about 200° F., and separately recovering a clear acidic fraction and a solids carrying fraction.

2. A method of clarifying concentrated acidic phosphorus-bearing solution selected from the group consisting of wet process phosphoric acid and solutions of mixtures of monocalcium phosphate and wet process phosphoric acid predominated by phosphoric acid which comprises mixing into said acidic solution successively with agitation from about 0.5% to about 2.0% by weight of nitric acid, and from about 0.08 pound to about 0.3 pound per ton of said acidic solution of a water-soluble high molecular weight synthetic polyacrylamide resin, holding the mixture at a temperature of between about 160° F. and about 200° F., and separately recovering a clear acidic fraction and a solids carrying fraction.

3. A method of clarifying concentrated acidic phosphorus-bearing solution selected from the group consisting of wet process phosphoric acid and solutions of mixtures of monocalcium phosphate and wet process phosphoric acid predominated by phosphoric acid which comprises mixing into 200 parts by weight of said acidic solution of about 52.8% P$_2$O$_5$, held at a temperature of about 200° F., one part by weight of nitric acid on a 100% equivalent basis, stirring the mixture for 5 minutes, adding 0.1 pound of water-soluble high molecular weight synthetic polyacrylamide resin, holding the acidic mixture at a temperature of about 180° F. in a solids settling zone, and separately recovering from said zone clarified concentrated acidic phosphorus-bearing solution and a slurry of concentrated solids.

4. A method of clarifying a concentrated acidic phosphorus-bearing solution selected from the group consisting of wet process phosphoric acid and solutions of mixtures of monocalcium phosphate and wet process phosphoric acid predominated by phosphoric acid which comprises mixing into said acidic solution successively with agitation, at least about 0.5% by weight of an oxidizing agent selected from the group consisting of nitric acid, potassium permanganate, potassium dichromate hypochlorous acid, and mixtures thereof, and at least about 0.08 pound per ton of said acidic solution of a flocculating agent stable in strong acid solution selected from the group consisting of water-soluble high molecular weight synthetic polyacrylamide resin, water-soluble high molecular weight hydrolyzed synthetic polyacrylonitrile resin, and the potassium and sodium salts thereof, and mixtures thereof, holding the mixture at a temperature between about 160° F. and the deactivating temperature of the flocculating agent in said acidic solution, and separately recovering a clear acidic fraction and a solids carrying fraction.

5. A method of clarifying a concentrated acidic phosphorus-bearing solution selected from the group consisting of wet process phosphoric acid and solutions of mixtures of monocalcium phosphate and wet process phosphoric acid predominated by phosphoric acid which comprises mixing into said acidic solution successively with agitation from about 0.5% to about 2.0% by weight of an oxidizing agent selected from the group consisting of nitric acid, potassium permanganate, potassium dichromate, hypochlorous acid, and mixtures thereof, and from about 0.08 pound ot about 0.3 pound per ton of said acidic solution of a flocculating agent stable in strong acid solution selected from the group consisting of water-soluble high molecular weight synthetic polyacrylamide resin, water-soluble high molecular weight hydrolyzed synthetic polyacrylonitrile resin, and the potassium and sodium salts thereof, and mixtures thereof, holding the mixture at a temperature between about 160° F., and the deactivating temperature of the flocculating agent in said acidic solution, and separately recovering a clear acidic fraction and a solids carrying fraction.

References Cited in the file of this patent

UNITED STATES PATENTS

| | | |
|---|---|---|
| 1,597,984 | La Bour | Aug. 31, 1926 |
| 1,856,144 | Wietzel et al. | May 3, 1932 |
| 2,830,872 | McCullough | Apr. 15, 1958 |

FOREIGN PATENTS

| | | |
|---|---|---|
| 761,021 | Great Britain | Nov. 7, 1956 |
| 154,799 | Australia | Jan. 19, 1954 |

OTHER REFERENCES

Dow Diamond, vol. 18, No. 1, March 1955, pages 1–31.